Figure 1:
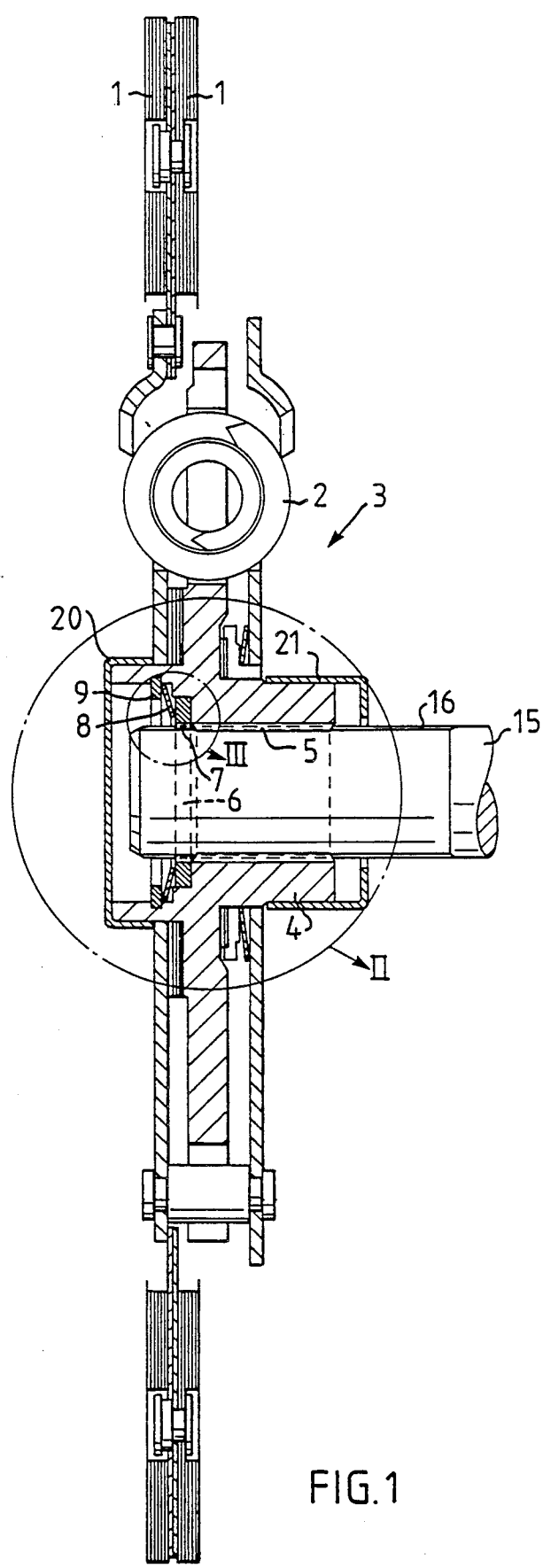

United States Patent [19]

Janiszewski

[11] Patent Number: 4,989,712
[45] Date of Patent: Feb. 5, 1991

[54] DEVICE FOR REDUCING MECHANICAL RATTLE IN A VEHICLE COUPLING
[75] Inventor: Grzegorz Janiszewski, Angered, Sweden
[73] Assignee: AB Volvo, Gothenburg, Sweden
[21] Appl. No.: 389,971
[22] Filed: Aug. 7, 1989
[30] Foreign Application Priority Data
Aug. 18, 1988 [SE] Sweden .................................. 8802929
[51] Int. Cl.⁵ .......................... F16D 1/08; F16D 13/68
[52] U.S. Cl. ................................ 192/106.1; 192/30 V; 464/160
[58] Field of Search ............... 192/30 V, 70.17, 106.1, 192/106.2; 464/51, 160, 161
[56] References Cited
U.S. PATENT DOCUMENTS
2,745,268 5/1956 Reed ........................ 192/70.17 X
3,800,931 4/1974 Maucher ..................... 192/70.17 X FOREIGN PATENT DOCUMENTS
433390 5/1984 Sweden .
1545416 5/1979 United Kingdom .

Primary Examiner—Rodney H. Bonck
Attorney, Agent, or Firm—Young & Thompson

[57] ABSTRACT

Device for reducing mechanical rattle in a splines connection between a shaft (15) and a sleeve element (4) surrounding the shaft, especially between the input shaft to a vehicle gearbox and the hub sleeve of the clutch disc. The device consists of a metal washer (6) with less backlash against the splines (16) of the shaft (15) than the hub sleeve. The washer is biassed by means of a spring washer (8) against a frictional surface (10) of the hub sleeve. The frictional torque is selected so that the washer when shifting between normal engine drive and engine braking rotates relative to the hub sleeve, but is fixed relative thereto when idling.

5 Claims, 2 Drawing Sheets

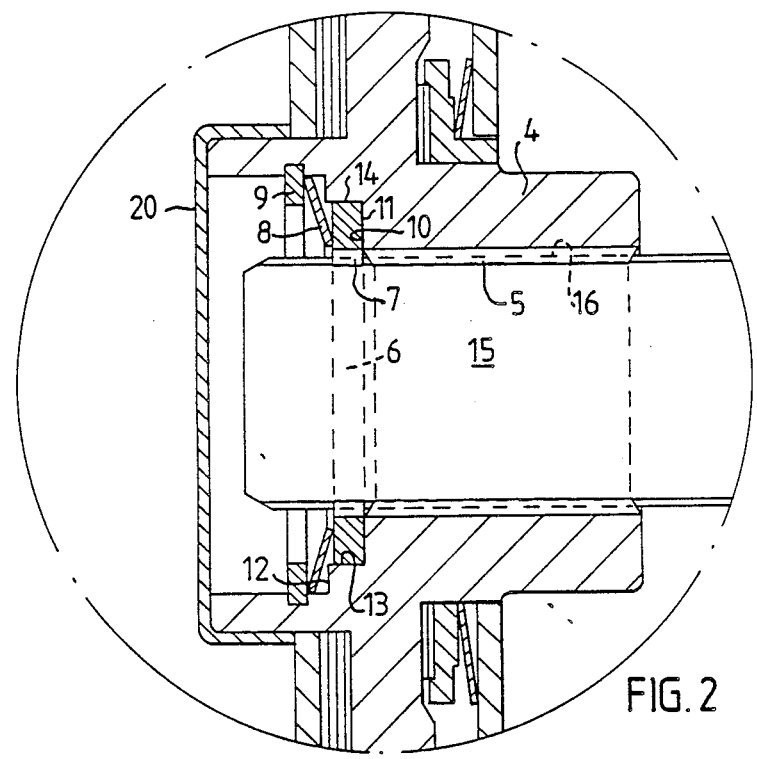
FIG. 2
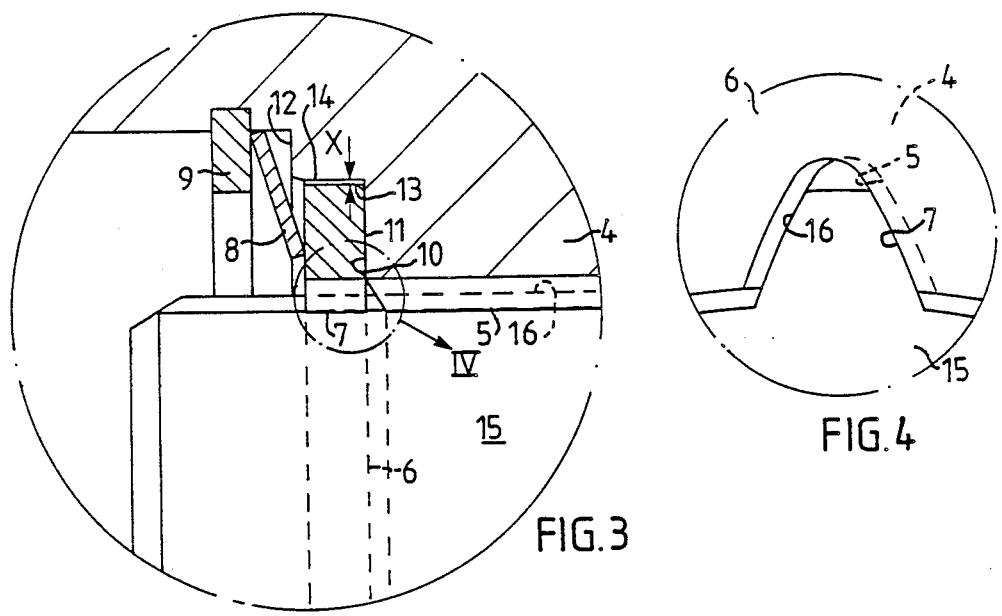
FIG. 3
FIG. 4

DEVICE FOR REDUCING MECHANICAL RATTLE IN A VEHICLE COUPLING

The present invention generally relates to a device for reducing mechanical rattle between a shaft and a sleeve element surrounding the shaft, which have inter-engaging splines. It especially relates to a device for reducing so-called idle rattle which arises in a vehicle clutch due to the backlash in the splines connection between the disc hub of the clutch and the input shaft to the gearbox when the engine is idling.

In most automobiles with an automatic transmission and a conventional dry disc clutch there is mechanical rattling at idle. The rattle stems approximately equally from the gearbox and from the clutch The noise arises when the tooth flanks of the gearbox gears and the splines flanks in the splines connection between the disc hub and the input shaft of the gearbox strike against each other with a certain frequency when said components are imparted an acceleration or retardation due to the non-uniform running of the engine at low rpm. The oscillations arising also are due to the drag torque of the gearbox.

Several different methods are known for reducing or completely eliminating idle rattle stemming from the gearbox itself. It is for example possible to reduce the backlash between the gears, to increase the drag torque by means of frictional braking means in the gearbox or by pretensioning the gears in relation to each other. Production engineering considerations limit however the possibilities of limiting the backlash as much as is needed to make rattle reduction effective. A friction brake providing sufficient drag torque will affect the shifting forces negatively. Even the pretensioning of the gears can produce negative effects due to the fact that the pretensioning devices themselves have a tendency to produce noise.

Since the backlash in the splines connection between the clutch disc hub and the input shaft to the gearbox has the same influence on the idle rattling as the gear backlash in the gearbox, much would be won if this backlash could be reduced significantly or even entirely eliminated. The problem is however that disc hubs normally must be tempered. The tempering affects the shape of the hub splines. Since the hub must be able to be displaced axially unimpeded for releasing or engaging and in order to compensate for disc wear, the hub splines must be dimensioned with an excessive size in relation to the shaft splines. This is to eliminate the risk that a change in shape induced by the tempering will cause the hub to stick to the shaft.

The purpose of the present invention is generally to achieve a device for reducing rattle in a splines connection. Especially the purpose is to achieve a simple and inexpensive device of this type which is particularly suited for use in the splines connection between a disc clutch hub and the input shaft to a gearbox.

This is achieved according to the invention by virtue of the fact that an annular element with internal splines engages the splines of the shaft and has a frictional surface which is pressed against a frictional surface on the sleeve element.

Such a separate annular element need not be tempered, and can therefore be produced with very small tolerances and with small backlash against the splines of the shaft.

The invention will be described in more detail with reference to examples shown in the accompanying drawings, where FIG. 1 shows a longitudinal section through a disc in a vehicle clutch with one embodiment of a device according to the invention, FIG. 2 an enlargement of the circled area II in FIG. 1, FIG. 3 an enlargement of the circled area III in FIG. 1 in a somewhat modified embodiment, and FIG. 4 an end view illustrating the splines connection in the embodiment in FIG. 3.

The disc shown in FIG. 1 is of conventional design with a frictional surface 1, springs 2, a disc center generally designated 3, comprising a sleeve-shaped hub 4, which can consist of tempered material and has internal splines 5.

According to the invention the disc is provided with a rattle-reducing device consisting of a metal washer 6 with internal splines 7, a spring washer 8 biased against the washer 6, a lock ring 9 which is placed in a groove in the sleeve 4 to keep the spring 8 in place. The surfaces 10 and 11 of the sleeve 4 and the washer 6 form interacting frictional surfaces. The sleeve 4 is made with a step 12 with an internal peripheral surface 13 surrounding the washer 6.

In the embodiment shown in FIGS. 1 and 2, the washer 6 is centered against the step 12, i.e. there is no play between the surface 13 and the peripheral surface 14 of the washer. The pretensioning of the spring 8 is adapted to the frictional surfaces 10,11 so that the frictional torque between the sleeve 4 and the washer 6 will be equal to or in any case not be less than the drag torque at idle of the gearbox (not shown) on the input shaft 15 on which the disc is mounted, or is equal to or is not less than the moment of inertia of the rotating components of the gearbox reduced to the input shaft 15 and multiplied by the isolation acceleration at idle.

The washer 6 can be manufactured without tempering, which means that the splines can be produced so that very little backlash is obtained against the splines 16 of the shaft 15. At normal operation, the frictional connection between the clutch hub 4 and the washer 6 provides that the washer will rotate relative to the hub when there is a change in the direction of torque transmission, i.e. when changing from engine drive to engine braking and vice versa. When idling however the frictional torque is sufficient to fix the washer 6 relative to the hub sleeve, which means that the effective play in the splines connection and that which determines the idle rattle is the play between the splines 7 of the washer 6 and the splines 16 of the shaft 15.

FIGS. 3 and 4 show an embodiment which makes it possible to achieve a completely play-free splines connection between the disc hub and the shaft. This embodiment differs from the embodiment described above only in that the washer 6 is dimensioned so that there is a small play "x" between the surface 13 of the step 12 and the peripheral surface 14 of the washer 6. By making it possible in this manner for the washer 6 to both rotate and be displaced radially relative to the hub sleeve 4, the washer can take up the entire play between the splines of the hub sleeve 4 and the shaft 15 and when idling achieve a completely play-free connection, as illustrated in FIG. 4.

By using a frictional connection between the hub sleeve 4 and the washer 6 in the manner described above, one avoids any other biasing in the system which guarantees that the disc can be displaced axially on the shaft without impediment when engaging and disengaging.

In order to prevent particles from the clutch surfaces from penetrating into the splines connection and at the same time in order to prevent grease from flowing out to the surfaces, there are two protective caps 20, 21 pressed onto the hub sleeve 4. In the embodiment shown with a shaft 15 without a supporting bearing in the engine flywheel, one side of the hub is completely encapsulated by the cap 20.

I claim:

1. Device for reducing mechanical rattle between a shaft and a sleeve element surrounding the shaft, having interengaging splines, comprising an annular element (6) with internal splines (7) which engages splines (16) on the shaft (15) and has a frictional surface (11) pressed against a frictional surface (10) of the sleeve element (4), the sleeve element (4) having an annular step (12) concentric with its splines (5), which step surrounds the annular element (6).

2. Device according to claim 1, wherein the annular step (12) has a peripheral surface (13) in contact with the periphery (14) of the annular element (6) for centering of the annular element.

3. Device according to claim 1, wherein the annular step (12) has a peripheral surface (13) facing the periphery (14) of the annular element (6), there being a small play (x) between the periphery of the annular element and said surface (13).

4. Device for reducing mechanical rattle between a shaft and a sleeve element surrounding the shaft, having interengaging splines, comprising an annular element (6) with internal splines (7) which engages splines (16) on the shaft (15) and has a frictional surface (11) pressed against a frictional surface (10) of the sleeve element (4), the annular element (6) having a small axial dimension in relation to the sleeve element (4), said frictional surface (11) being a radial frictional surface, which, by means of a spring element (8) in contact with the annular element, is spring-biassed towards a radial frictional surface (10) of the sleeve element (4), the spring element (8) being a spring washer which is pretensioned and axially fixed against the annular element (6) by a lock ring (9) mounted in an annular groove in the sleeve (4).

5. Device for reducing mechanical rattle between a shaft and a sleeve element surrounding the shaft, having interengaging splines, comprising an annular element (6) with internal splines (7) which engages splines (16) on the shaft (15) and has a frictional surface (11) pressed against a frictional surface (10) of the sleeve element (4), the sleeve element (4) comprising a disc hub in a motor vehicle clutch and the shaft (15) the input shaft to a gearbox, the force of a spring element (8) pressing against the annular element (6) being such that the frictional torque between the sleeve (4) and the annular element (6) is equal to a drag torque of the connected gearbox at idle or its rotating components' moment of inertia reduced to the input shaft (15) and multiplied by an oscillation acceleration at idle.

* * * * *